United States Patent
Zhou et al.

(10) Patent No.: US 9,911,208 B2
(45) Date of Patent: Mar. 6, 2018

(54) APPARATUS AND METHOD OF ITERATIVE IMAGE RECONSTRUCTION USING REGULARIZATION-PARAMETER CONTROL

(71) Applicant: TOSHIBA MEDICAL SYSTEMS CORPORATION, Otawara-shi (JP)

(72) Inventors: Jian Zhou, Buffalo Grove, IL (US); Wenli Wang, Briarcliff Manor, NY (US); Yi Fan, Chicago, IL (US); Zhou Yu, Wilmette, IL (US)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 122 days.

(21) Appl. No.: 15/095,951

(22) Filed: Apr. 11, 2016

(65) Prior Publication Data
US 2017/0294034 A1    Oct. 12, 2017

(51) Int. Cl.
*G06K 9/00*       (2006.01)
*G06T 11/00*     (2006.01)
*G06T 7/00*       (2017.01)

(52) U.S. Cl.
CPC .......... *G06T 11/008* (2013.01); *G06T 7/0012* (2013.01); *G06T 2207/10081* (2013.01);
(Continued)

(58) Field of Classification Search
None
See application file for complete search history.

(56) References Cited

U.S. PATENT DOCUMENTS

| | | | |
|---|---|---|---|
| 2006/0215891 A1* | 9/2006 | Fessler | G06T 11/005 382/128 |
| 2016/0338611 A1* | 11/2016 | Kalinin | A61B 5/0422 |
| 2017/0053423 A1* | 2/2017 | Ahn | G06T 11/003 |

OTHER PUBLICATIONS

J. Fessler, "Mean and Variance of Implicitly Defined Biased Estimators (such as Penalized Maximum Likelihood): Applications to Tomography," IEEE Transactions on Image Processing, vol. 5, pp. 493-506, Mar. 1996.

(Continued)

*Primary Examiner* — Shervin Nakhjavan
(74) *Attorney, Agent, or Firm* — Oblon, McClelland, Maier & Neustadt, L.L.P.

(57) ABSTRACT

A method and apparatus is provided to predict a regularization parameter for regularized iterative reconstruction of radiation detection data (e.g., computed tomography (CT) data or positron-emission tomography (PET) data) to generate a reconstructed image having specified statistical properties. The predicted regularization parameter is determined using a root-finding method performed on a transcendental objective function. The objective function is calculated using a three-dimensional Fourier transforms of an approximation to a shift invariant Hessian matrix and of matrix products between the forward-projection and back projection matrices of the system model and various (statistical) weight matrices. The specified statistical properties can include the standard deviation within a region of interest, a local spatial resolution, a low-contrast-detectability metric, etc. In addition to the specified statistical properties, the prediction of the regularization parameter accounts for the statistical properties of the radiation detection data, the display field of view, and the system model.

20 Claims, 8 Drawing Sheets

(52) U.S. Cl.
CPC ............... *G06T 2207/10104* (2013.01); *G06T 2211/424* (2013.01)

(56) References Cited

OTHER PUBLICATIONS

S. Ahn and R. M. Leahy, "Analysis of Resolution and Noise Properties of Nonquadratically Regularized Image Reconstruction Methods for PET" IEEE Transactions on Image Processing, vol. 27, No. 3, pp. 413-424, Mar. 2008.

J. Qi and R.M. Leahy, "A theoretical study of the contrast recovery and variance of MAP reconstructions from PET data," IEEE Transactions on Medical Imaging, vol. 18, No. 4, pp. 293-305, 1999.

D. Wilson, et al, "Noise properties of the EM algorithm: II. Monte Carlo simulations," Physics in Medicine and Biology, vol. 39, pp. 847-872, 1994.

W. Wang and G. Gindi, "Noise analysis of MAP-EM algorithms for emission tomography," Physics in Medicine and Biology, vol. 42, pp. 2215-2232, 1997.

J. Qi, "A unified noise analysis for iterative image estimation," Physics in Medicine and Biology, vol. 48, pp. 3505-3519, 2003.

J. W. Stayman and J. A. Fessler "Compensation for Nonuniform Resolution Using Penalized-Likelihood Reconstruction in Space-Variant Imaging Systems," vol. 23, No. 3, pp. 269-284, Mar. 2004.

Stephen M. Schmitt and Jeffrey A. Fessler, "Fast Variance Prediction for Iterative Reconstruction of 3D Helical CT Images," Fully3D meeting, 2013.

J. Qi and R.M. Leahy, "Resolution and Noise Properties of MAP Reconstruction for Fully 3-D PET," vol. 19, No. 5, pp. 493-506, May 2000.

\* cited by examiner

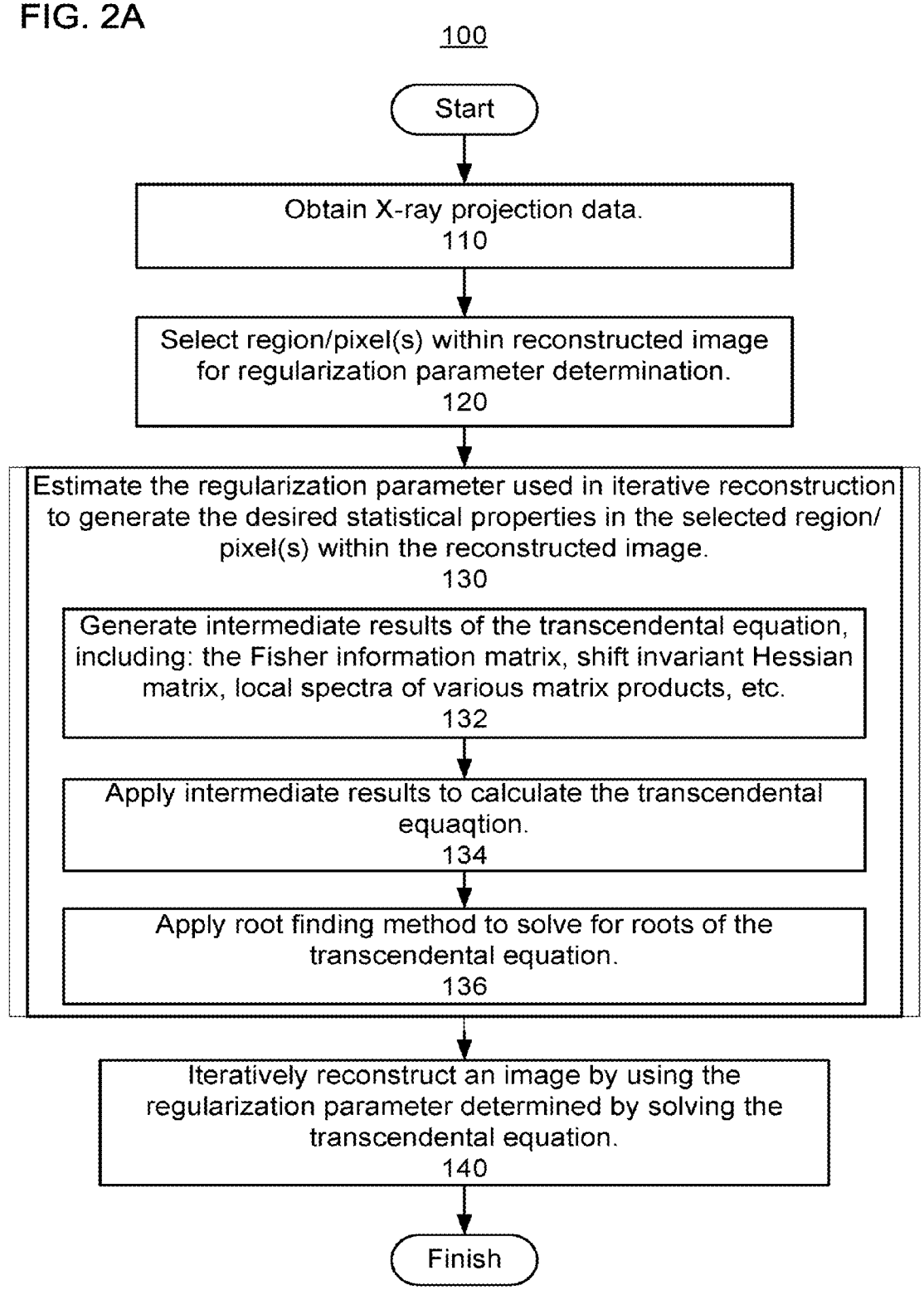

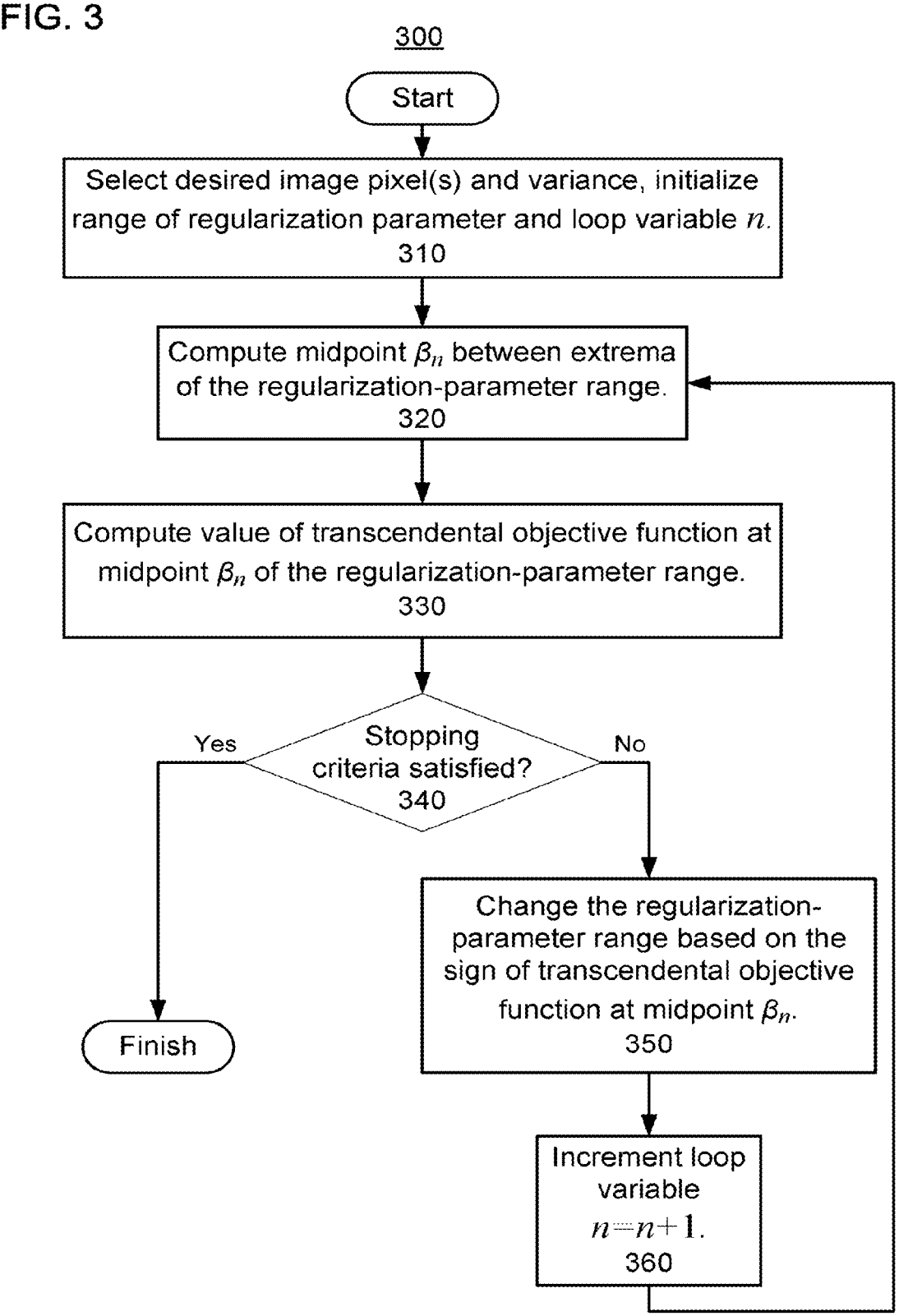

APPARATUS AND METHOD OF ITERATIVE IMAGE RECONSTRUCTION USING REGULARIZATION-PARAMETER CONTROL

FIELD

This disclosure relates to estimating a relation between a regularization parameter and properties of a reconstructed image (e.g., the statistical properties and local spatial resolution of the image), the image being reconstructed from radiation detection data using regularized iterative reconstruction (IR) and the regularization parameter expressing the strength of a regularization function used in the IR. Further, the disclosure relates more particularly to estimating a relation between the reconstructed-image properties and the regularization parameter to account for the display field of view (dFOV) of the reconstructed image, the statistical properties of the radiation detection data, and a system model including a forward-projection matrix and a back-projection matrix, such that the forward-projection and back-projection matrices need not be matched.

BACKGROUND

In both X-ray computed tomography (CT) and positron emission tomography (PET), iterative reconstruction can be used to generate reconstructed images of a subject. In both cases a system matrix A can be used to express relations between the detected X-ray data y and the reconstructed image x, as expressed by the system-matrix equation $$Ax=y.$$

In CT image reconstruction, the system matrix A represents X-ray trajectories through a subject, such that the X-ray intensity after propagating through the subject is dependent upon the attenuation along the X-ray trajectory through the subject. In PET, the system matrix A represents the line of response (LOR) indicated by the detection of two X-rays from a single electron-positron annihilation event. The LOR represents a line between the two detectors that detect the two X-rays from the annihilation event.

While there are various iterative reconstruction (IR) methods, such as the algebraic reconstruction technique, one common IR method is to solve the optimization problem $$\operatorname*{argmin}_{x}\{\|x-y\|_{W}^{2}+\beta U(x)\}$$

to obtain the argument x that minimizes the above cost function in the curly brackets. For example, in X-ray CT, A is the system matrix that represents X-ray trajectories (e.g., a line integral or Radon transform or X-ray transform representing a given X-ray path) from an X-ray source through an object OBJ to an X-ray detector, y represents projection images (e.g., the X-ray intensity at the X-ray detector) generated at a series of projection angles, and x represents the reconstructed image of the X-ray attenuation of the object OBJ. The notation $\|g\|_w^2$ signifies a weighted inner product of the form $\frac{1}{2}g^T W g$, wherein W is the weight matrix. For example, when the noise between X-ray detector elements is uncorrelated, the weight matrix W can be the inverse of the noise of the projection data. The system-matrix term $\|Ax-y\|_w^2$ is minimized when the forward projection A of the reconstructed image x provides a good approximation to all measured projection images y. In the above expression, U(x) is a regularization function, and β is a regularization parameter that weights the relative contributions of the system-matrix term and the regularization term.

IR methods augmented with regularization can have several advantages over other reconstruction methods such as filtered back-projection. For example, IR methods augmented with regularization can produce high-quality reconstructions even when the projection data includes only sparse projection angles (i.e., few-view projection data) or when the signal-to-noise ratio is poor (i.e., noisy projection data). For few-view, limited-angle, and noisy projection data, the use of a regularization function imposes predefined characteristics on the reconstructed image according to some a priori model of the object OBJ. For example, enforcing positivity for the attenuation coefficients can provide regularization based on the a priori model that each pixel either absorbs X-rays or is transparent (i.e., no X-ray gain), which, as a practical matter, is a virtual certainty in clinical applications. Note the word "pixel" designates a value in an array of arbitrary dimension, including, e.g., two-dimensional pixels in a two-dimensional image array, and three-dimensional volume pixels or voxels in a three-dimensional image array.

Other regularization terms can similarly rely on a priori knowledge of characteristics or constraints imposed on the reconstructed image. For example, minimizing the "total variation" (TV) in conjunction with projection on convex sets (POCS) is also a very popular regularization scheme. The TV-minimization algorithm assumes that the image is predominantly uniform over large regions with sharp transitions at the boundaries of the uniform regions, which is generally true for a clinical image of various organs, each of which will exhibit an approximately constant X-ray absorption coefficient throughout the organ (e.g., bone can have a first absorption coefficient, the lungs have a second coefficient, and the heart has a third coefficient). When the a priori model corresponds well to the image object OBJ, these regularized IR algorithms can produce good image quality even though the reconstruction problem is significantly underdetermined (e.g., few view scenarios), missing projection angles, or noisy.

While the regularization term can generally improve the noise characteristics of a reconstructed image x, the size of the improvement to the signal-to-noise ratio in a reconstructed image will depend on the size of the regularization parameter β. When β is large, the signal-to-noise ratio of the reconstructed image can decrease, and when β is small the signal-to-noise ratio of the reconstructed image can increase. On the other hand, making the regularization parameter β very large can hinder the spatial resolution for certain choices of regularization functions.

Additionally, the signal-to-noise ratio of the reconstructed image can depend on the size of the display field of view (dFOV), the system model expressed by the forward-projection and back-projection matrices, and statistical properties of the projection data. Current methods are insufficient to select a regularization parameter β, prior to performing regularized IR, that is ensured to generate a reconstructed image having specified statistical characteristics for a given set of projection data, system model, and dFOV. This limitation of the current methods for selecting the regularization parameter β for a certain reconstruction task and to achieve a reconstructed image having specified noise properties and image quality applies to both CT and PET systems.

PET systems are widely used in medical imaging. In positron emission tomography (PET) imaging, a radiopharmaceutical agent is introduced into the object to be imaged via injection, inhalation, or ingestion. After administration of the radiopharmaceutical, the physical and bio-molecular properties of the agent cause it to concentrate at specific locations in the human body. The actual spatial distribution of the agent, the intensity of the region of accumulation of the agent, and the kinetics of the process from administration to its eventual elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are combined. Most of the time, an annihilation event produces two gamma rays (at 511 keV) traveling at substantially 180 degrees apart.

In order to be able to reconstruct the spatio-temporal distribution of the radio-isotope via tomographic reconstruction principles, each detected event will need to be characterized for its energy (i.e., amount of light generated), its location, and its timing. By detecting the two gamma rays, and drawing a line between their locations, i.e., the line-of-response (LOR), one can determine the likely location of the original disintegration. While this process will only identify a line of possible interaction, by accumulating a large number of those lines, and through a tomographic reconstruction process, the original distribution can be estimated. In addition to the location of the two scintillation events, if accurate timing (within a few hundred picoseconds) is available, a time-of-flight (TOF) calculation can add more information regarding the likely position of the event along the line. Limitations in the timing resolution of the scanner will determine the accuracy of the positioning along this line. The collection of a large number of events creates the necessary information for an image of an object to be estimated through tomographic reconstruction.

PET imaging systems use detectors positioned across from one another to detect the gamma rays emitting from the object. A ring of detectors can be used in order to detect gamma rays coming from each angle. Thus, a PET scanner can be substantially cylindrical to be able to capture as much radiation as possible, which should be, by definition, isotropic. PET scanners can be composed of several thousand individual crystals (i.e., scintillator elements), which are arranged in two-dimensional scintillator arrays that are packaged in modules with photodetectors to measure the light pulses from respective scintillation events. The relative pulse energy measured by the photodetectors is used to identify the position of the scintillation event.

Computed tomography (CT) systems have some similarities and some differences with PET systems. CT systems and methods are also widely used for medical imaging and diagnosis. CT systems generally create images of one or more sectional slices through a subject's body. A radiation source, such as an X-ray source, irradiates the body from one side. A collimator, generally adjacent to the X-ray source, limits the angular extent of the X-ray beam, so that radiation impinging on the body is substantially confined to a planar (or volume) region defining a cross-sectional slice of the body. At least one detector (and generally many more than one detector) on the opposite side of the body receives radiation transmitted through the body substantially in the plane of the slice. The attenuation of the radiation that has passed through the body is measured by processing electrical signals received from the detector. The projection data at a series of projection angles (i.e., a CT scan) are then recorded and/or processed to reconstruct an image of the sampled planar region (or volume).

A CT sinogram is an arrangement of the projection data displaying attenuation through the body as a function of "space" along a detector array along a first axis (or set of axes) and "time/angle" of a CT scan along a second axis. The space dimension refers to the position along a one-dimensional array of X-ray detectors. The time/angle dimension refers to the projection angle of X-rays changing as a function of time, such that as time progresses the projection angle increments and projection measurements are performed at a linear succession of projection angles. The attenuation resulting from a particular volume will trace out a sine wave around the vertical axis—volumes farther from the axis of rotation having sine waves with larger amplitudes, the phase of a sine wave determining the volume's angular position around the rotation axis. Performing an inverse Radon transform or equivalent image reconstruction method reconstructs an image from the projection data in the sinogram—the reconstructed image corresponding to a cross-sectional slice (or volume) of the body.

BRIEF DESCRIPTION OF THE DRAWINGS

A more complete understanding of this disclosure is provided by reference to the following detailed description when considered in connection with the accompanying drawings, wherein:

FIG. 2A shows a flow diagram of a method, according to one implementation, for predicting a regularization parameter according to predefined specifications of the reconstructed image, the dFOV, the system model, and the statistical properties of the radiation detection data, and the iteratively reconstructing an image using the predicted regularization parameter;

FIG. 3 shows a flow diagram of a process, according to one implementation, for finding a root of an equation such as the transcendental objective function for predicting the regularization parameter;

DETAILED DESCRIPTION

Figure 1A:
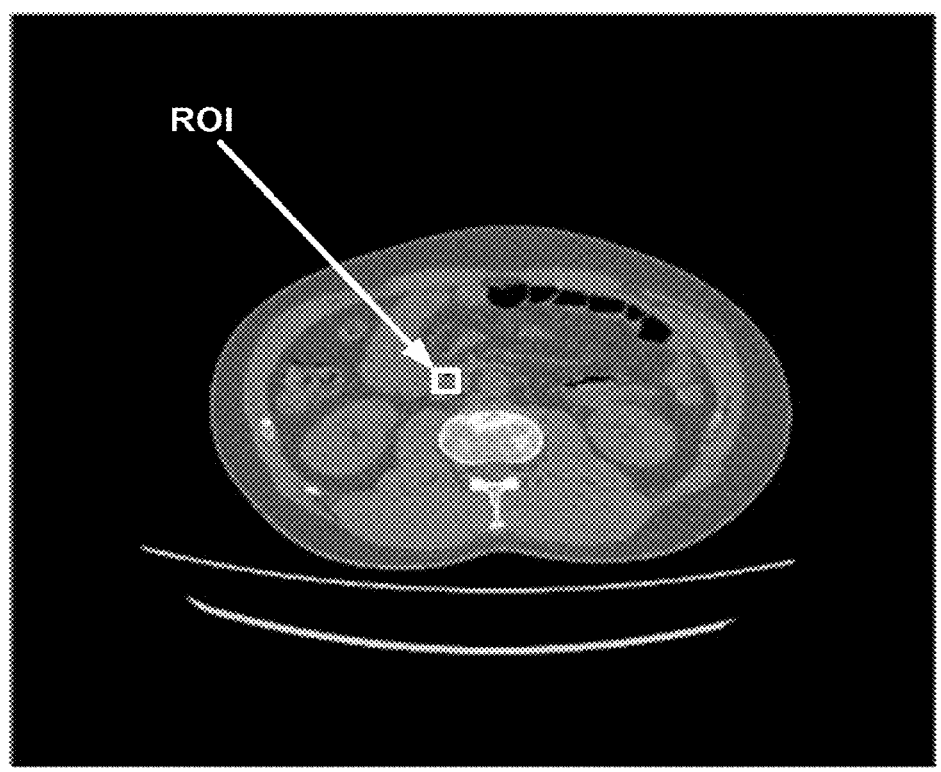
FIG. 1A shows a reconstructed image having a display field of view (dFOV) of 480 mm.
Figure 1B:
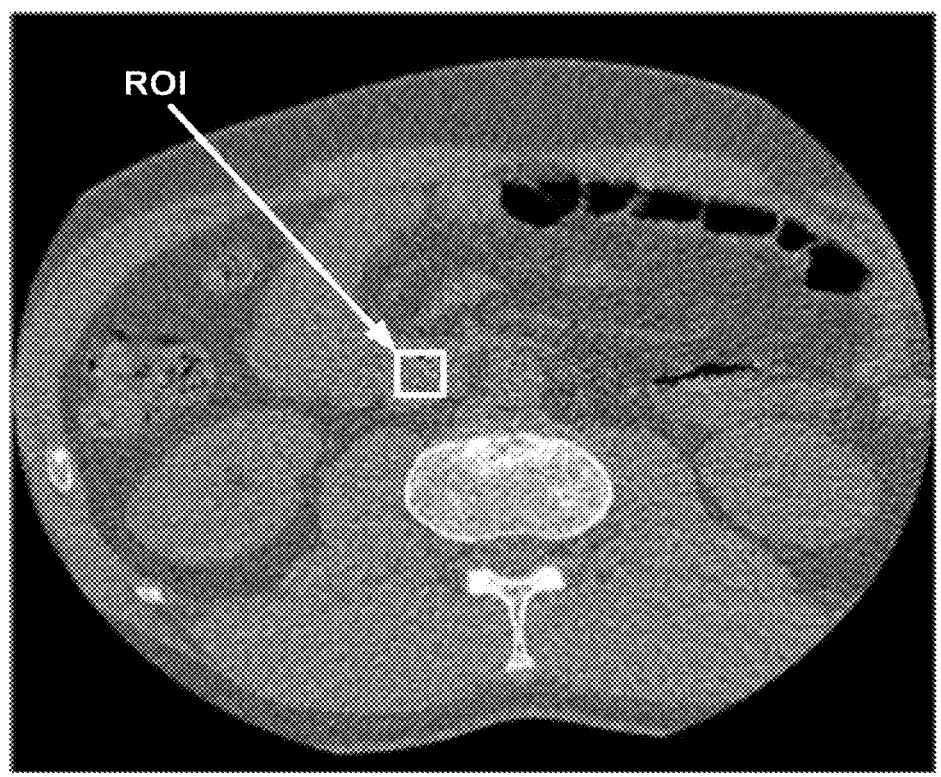
FIG. 1B shows a reconstructed image having a display field of view (dFOV) of 240 mm.
Figure 1C:
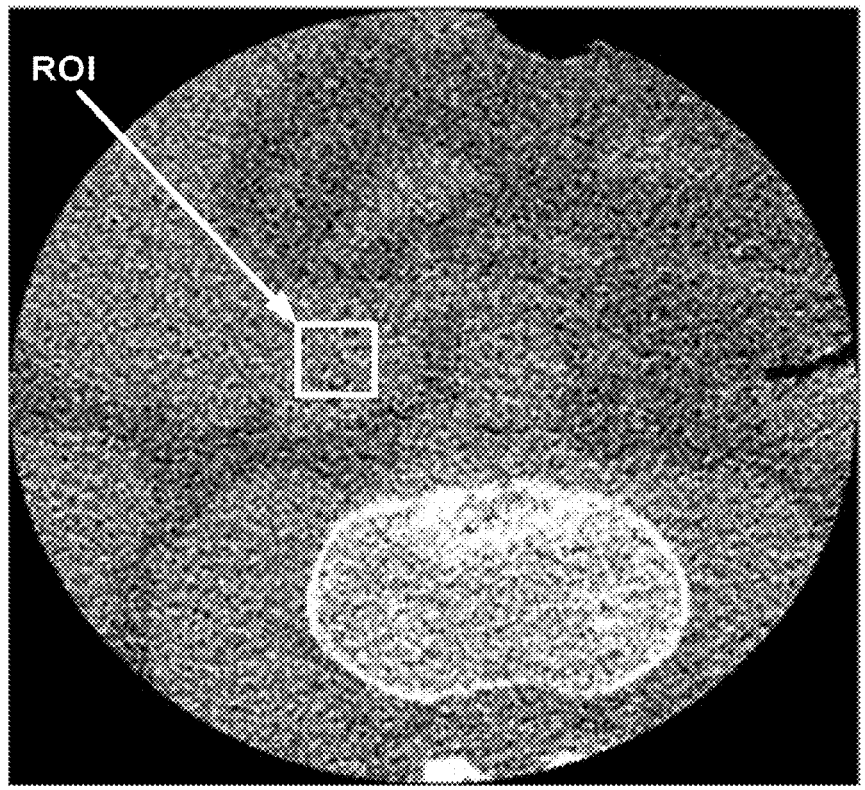
FIG. 1C shows a reconstructed image having a display field of view (dFOV) of 120 mm.
Figure 1D:
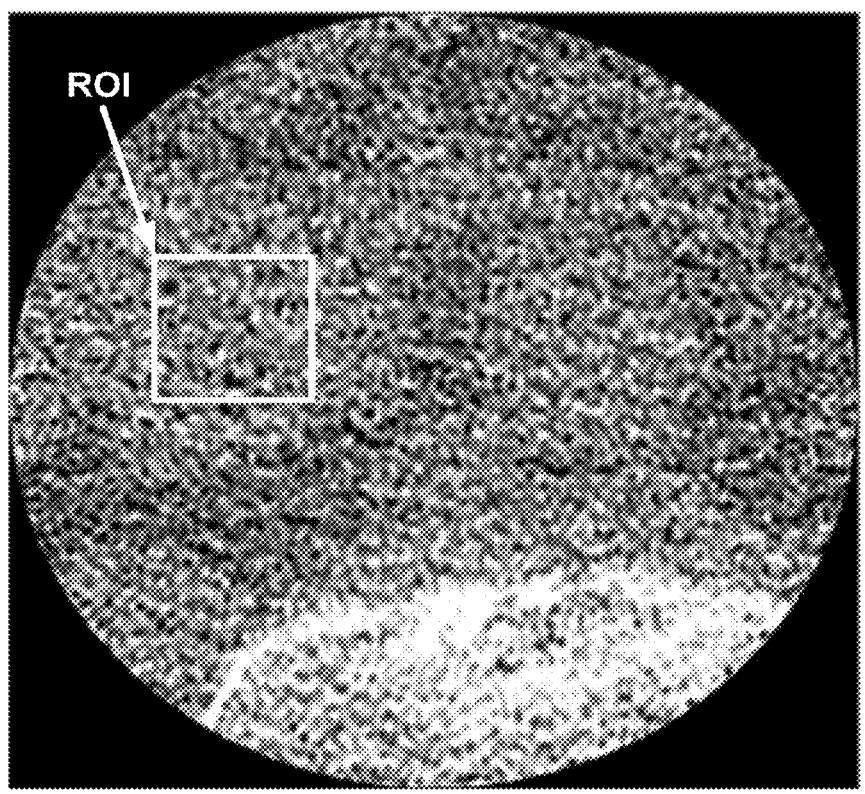
FIG. 1D shows a reconstructed image having a display field of view (dFOV) of 60 mm.

Statistically-based iterative reconstruction (IR) has several advantages that recommend it for the reconstruction of images based on X-ray computed tomography (CT) and positron-emission tomography (PET). For example, statistically based IR enables the incorporation of an accurate system model incorporating various physical effects in order to reconstruct a good quality image of the subject. Accordingly, statistically based IR advantageously enables the production of images with higher image quality than conventional analytical method. The quality of images reconstructed using IR can be further enhanced by incorporating a regularization technique. The regularization technique can be used to control the noise properties of reconstructed image. By properly selecting or designing a regularizer, the noise in the reconstructed image can be suppressed while preserving image features such as sharp edges around organ boundaries and fine structures within and between organs.

While regularized IR is a powerful tool, many challenges still remain. For example, current methods of selecting the regularization parameter to optimize the strength of regularizer do not accurately predict the resultant noise properties in the corresponding reconstructed image for a given choice of regularization parameter and display field of view (dFOV). Thus, many users of IR for CT and PET must guess the magnitude of regularization parameter required in order to obtain a desired noise level in reconstructed image. When the user has guessed the wrong regularization parameter resulting in a noise level of the reconstructed image falling outside of the desired/acceptable limits, the user must guess another regularization parameter and repeat the reconstruction process again and again while hoping to eventually guess a regularization parameter and reconstructed image having the desired noise characteristics.

Further, if the user subsequently changes the dFOV or uses different X-ray data having different statistical properties, the user must repeat the guess-and-check procedure for each change because different radiation detection data (radiation detection data includes both CT projection data and PET data) and different dFOVs result in different noise properties in the reconstructed image. Additionally, the noise properties of the reconstructed image can also depend on the choice of the forward projector and back projector used in the system model (e.g., the system model includes the system matrix A used for forward projections, and the back-projector B, and these can in turn depend on whether half-scan or full scan is being performed and the relative weighting of the various projection angles). Thus, in order to maintain consistent noise properties among a collection of reconstructed images, if any of the above-identified parameters changes, the regularization parameter would correspondingly change to maintain consistent statistical properties within a collection of reconstructed images. Further, knowing how much to change the regularization parameter is dependent on a method that can relate the regularization parameter to the statistical properties of the reconstructed image as a function of the above-identified parameters. Given this relation, it is possible to predict the regularization parameter that would generate desired statistical properties in the reconstructed image. The methods and apparatus described herein describe and apply this relation between the regularization parameter and the above-identified parameters upon which the regularization parameter depends.

Without a method to predict the regularization parameter corresponding to desired statistical properties of the reconstructed image, the user is limited to the above-described empirical cycle of guessing and checking which regularization parameters result in which noise properties for the reconstructed image. This empirical cycle can be inefficient.

Referring now to the drawings, wherein like reference numerals designate identical or corresponding parts throughout the several views, FIGS. 1A, 1B, 1C, and 1D show images generated from the same CT projection data but having different dFOVs. Each reconstructed image uses the same dataset and the same regularization parameter. The dFOV sizes for FIGS. 1A, 1B, 1C, and 1D are respectively 480 mm, 240 mm. 120 mm, and 60 mm. In each reconstructed image, a region of interest (ROI) is indicated corresponding to the same physical region of the subject. The statistical properties of these regions were compared and the variance within the ROI was observed to increase as the dFOV size decreased.

In a comparison of different datasets (as opposed to different dFOVs), it would similarly be observed that noise among images reconstructed from the different datasets would vary due to different X-ray dose levels and different subject sizes, for example. Thus, the same regularization parameter that is suitable for one dataset might not be suitable for others, if consistent noise properties (e.g., variance) are desired. That is to say, similar to FIGS. 1A, 1B, 1C, and 1D, different data sets of different subjects or even different organs/regions within the same subject might require different regularization parameter in order to maintain consistent noise parameters across the various reconstructed images.

Therefore, the choice of the regularization parameter can be used to stabilize IR noise properties among reconstructed images. On the other hand, an arbitrary or unguided choice of the regularization parameter can result in uncertainty and significant variation in the resultant noise properties of the reconstructed image. To tie the regularization parameter to the resultant noise properties of the reconstructed image, the methods described herein enable a prediction of the regularization parameter to achieve desired noise properties while accounting for the statistical properties of the radiation detection data, the dFOV size, and the system model for image reconstruction. Thus, the methods described herein enable consistent noise properties in reconstructed clinical images in order to better serve the purpose of clinical evaluation.

The methods described herein provide several advantages. First, the methods described herein can provide noise consistence that makes the image noise of iterative reconstruction independent of dose level, dFOV size, patient specifications, etc. Second, these methods can provide that the regularization parameter generates a target standard deviation for the reconstructed image. Third, these methods can provide theoretical predictions of the noise covariance of the reconstructed image for a wide selection of regularizers, including non-quadratic regularization functions. Fourth, these methods are able to account for any CT system model used in regularized IR including both matched and unmatched projectors. Unmatched projectors occur when the back projector B is not the inverse of the forward projector A; matched projectors occur when the back projector B is the inverse of the forward projector A, such that the matrix product of the back projector B with the forward projector A yields an identity matrix. Further, the methods described herein account for considerations of the effects of dose level, patient size and other physical factors by, e.g., using weighting matrices representing the statistical properties of the CT projection data or PET data. Sixth, the methods described herein apply to various scan topologies and scan modes, including, e.g., the circular-scan mode (i.e., axial or step-and-shoot), helical-scan mode, dynamic-scan mode, full-scan mode, and half-scan mode. Moreover, in certain implementations, the methods can include a novel technique to handle the local spectrum response of the non-quadratic regularizer, which enables the analysis of a broad range of regularization function, including the effects of spatial-variant weights, neighborhood weighting and pre-filtering. Finally, a further novel modification of the methods can be included in certain implementations to enable covariance matrix calculations with weight capping to make noise reduction adaptive to dose level. This novel modification automatically creates lower noise in high dose level data, which can be beneficial for low contrast detection/imaging tasks.

The methods described herein relate the regularization parameter to the noise properties of reconstructed images generated using regularized IR. Regularized IR can be described as finding an image x that minimizes the following cost function $$\Psi(x) = \tfrac{1}{2}(y-Ax)W(y-Ax) + \tfrac{1}{2}\beta U(x),$$

wherein y is the detected X-ray data, A is the forward projection (or forward projector), W is the weight matrix, U(•) is the regularization function, and β is the regularization parameter. The regularization function is generally given by $$U(x) = \sum_j v_j \sum_{k \in N_j} \omega_{jk} \rho(x_j - x_k)$$

wherein $v_1$ is the spatial-variant weight at pixel j, and $\omega_{jk}$ is the neighboring weight for pixels j and k ($N_j$ is the neighborhood of pixel j), and ρ(•) is the potential function. In certain implementations, the regularization function controls the smoothness of the penalty function. An example of the potential function ρ(•) is the Huber function, which can be expressed as $$\rho(x_j - x_k) = \begin{cases} \tfrac{1}{2}(x_j - x_k)^2, & d \geq |t| \\ d|x_j - x_k| - \tfrac{(x_j - x_k)^2}{2}, & \text{otherwise} \end{cases},$$

wherein d is a predefined constant. In certain implementations, an isotropic quadratic regularization function. can be used such that the regularization function is given by the function $$U(x) = \hat{\Delta}^2.$$

wherein $\hat{\Delta}$ is the nearby pixels differences of the reconstructed image x. In certain implementations, an anisotropic quadratic regularization function can be used. Thus, in addition to the Huber function, the regularization function U(x) can use any quadratic regularization function, any non-quadratic regularization function, any total-variation-minimization regularization function, or any other regularization function.

The statistics of the reconstructed image can be theoretically modeled using the IR noise covariance matrix, which is given by $$\text{Cov}\{\hat{x}\} = (BWA + \beta\overline{R}) BW\text{Cov}\{y\} WB^T((BWA + \tfrac{1}{2}\beta\overline{R})^{-1})^T$$

wherein B is the backprojection matrix (or back-projector), Cov{•} denotes the covariance operator, and $\overline{R}$ is the shift invariant Hessian matrix approximation of the regularization function. The matrix product BWA can be referred to as the Fisher information matrix. The above expression explicitly models the effect of using unmatched projection pairs. Using unmatched projector pairs can be beneficially for achieving significant speed enhancement of the IR processing by parallelizing the computation. For example, the speed of regularized IR can greatly enhanced using massively parallel computing hardware such as graphical processing units (GPUs).

The shift-invariant Hessian matrix can be calculated using the approximation $$\overline{R} = E\{R(\hat{x})\}$$

wherein E{•} is the expectation operator. The element of the matrix $\overline{R}$ can be calculated using the expression $$[\overline{R}]_{ij} = \begin{cases} E\left\{\sum_{k \in N_j}(v_j + v_k)w_{jk}\psi(\hat{x}_j - \hat{x}_k)\right\} & i = j \\ E\{-(v_i + v_j)w_{ij}\psi(\hat{x}_j - \hat{x}_i)\} & i \neq j, i \in N_j \end{cases},$$

which simplifies to $$[\overline{R}]_{ij} = \begin{cases} \sum_{k \in N_j}(v_j + v_k)w_{jk}E\{\psi(\hat{x}_j - \hat{x}_k)\} & i = j \\ -(v_i + v_j)w_{ij}E\{\psi(\hat{x}_j - \hat{x}_i)\} & i \neq j, i \in N_j \end{cases},$$

wherein $\psi(t) = \dot{\rho}(t)/t$ and $\dot{\rho}(\bullet)$ is the first-order derivative of ρ(•) with respect to its argument.

In certain implementations, the covariance of the reconstructed image, which is normally given by $$\text{Cov}\{\hat{x}\} = (BWA + \tfrac{1}{2}\beta\overline{R})BW\text{Cov}\{y\}WB^T((BWA + \tfrac{1}{2}\beta\overline{R})^{-1})^T,$$

can be modified such that the elements of the noise weighted covariance of the X-ray data y have a capped value. That is to say, the prediction adaptive data noise can be modeled using the modified covariance of X-ray data y, such that matrix elements of the diagonal terms of WCov{y}W can be modified to become $$[W\text{Cov}\{y\}W]_{ii} = \frac{[W]_{ii}^2}{[W]_{ii}} = \frac{[W]_{ii}^2}{\min([W]_{ii}, \text{cap})}$$

wherein $[W]_{ii}$ denotes the i-th diagonal element of matrix W and the variable cap is a predefined maximum value in the denominator. In certain implementations without a capping value, the statistical weight is proportional to the inverse of data variance. In certain other implementations, the parameter cap is applied, and the parameter cap can be chosen to be dose level dependent.

Using one of the above the implementations of the approximation to the covariance of the reconstructed image, a transcendental objective function φ(•) can be defined that relates the regulation parameter β to a desired standard deviation of the noise in the reconstructed image. Further, using a three-dimensional Fast-Fourier-Transform (FFT), the above expression can be rearranged such that the regulation parameter β can be rapidly predicted for a given data set, IR system model, dFOV, and regularizer. Thus, an FFT-based solution can be generated by solving for the root of the objective function $$\phi(\beta \mid \sigma_j^{USER}) = \sigma_j^{USER} - c \cdot \gamma \sqrt{\sum_l \frac{[\tilde{\lambda}_j]_l}{\left([\lambda_j]_l + \beta \cdot 100 \cdot \frac{v_j}{\sqrt{\tau(\sigma_j^{USER})^2 + \delta^2}} \cdot [\breve{\mu}_j]_l\right)^2}}$$

wherein $\sigma_j^{USER}$ is a user desired noise standard deviation at pixel j (unit in HU), c is a measurement data scaling factor to covert reconstruction pixel values from a linear attenuation coefficient into Hounsfield units, γ is a dFOV related scaling factor, $v_j$ is a spatial-variant weight at pixel j, and τ is the scaling factor for pixel correlations which also accounts for the prefiltering used in our IR. The values $\lambda_j$, $\mu_j$, and $\tilde{\lambda}_j$ are local response spectra of BWA, $\overline{R}$, and BWCov{y}WB$^T$, respectively.

The parameter c can depend on the image intensity unit. For example, if Hounsfield units are used in the reconstructed image, the parameter c can be determined as $1000/\mu_{water}$, wherein $\mu_{water}$ is the effective X-ray attenuation coefficient due to water.

The parameter γ applies when unmatched projectors are used. To understand why this is the case, consider that when unmatched projectors are used, B$^T$ cannot be replaced by A in the objective function calculations, unless an additional scaling factors is used to compensate the differences between λ and $\overline{\lambda}$. Such a scaling factor can be estimated empirically through multiple reconstructions using various datasets acquired in different scans. The basic assumption is that the change of regularization parameter should not affect this scaling factor when dFOV size is fixed. Therefore such a scaling factor can be determined by taking the ratio between the empirically observed standard deviation in the reconstructed images and the predicted standard deviation calculated using the above objective function.

The parameter δ can be determined based on the degree to which the edge is preserved in a reconstructed image. For example, delta=1(HU) often leads to an image with sharp edges. The parameter δ is given in the expression for the regularization function provided above.

The parameter τ corresponds to the pixel correlations. In most cases, for example, τ can be fixed at a value of 1.0.

To provide explicit representations of the values, it can first be recognized that, in general, the weight matrix can be decomposed as $W=W_rW_s$ into a diagonal matrix $W_r$ that contains the redundancy weight along its diagonal and a statistical weight matrix that is given by $W_s=\text{cov}^{-1}\{y\}$. When weight capping is applied, the statistical weight matrix can be expressed as $$[W_s]_{ii} = \frac{[W_s]_{ii}^2}{\min\{[W_s], \text{cap}\}}.$$

Give this background, the local spectra $\tilde{\lambda}_j$ applied in the transcendental objective function can be computed as the three-dimensional FFT of the j-th column of the matrix $BW_rW_sW_rA$ (in certain implementations the weight capping is included, and in others the weight capping is not included). The local $\lambda_j$ spectra can be computed as the three-dimensional FFT of the j-th column of the matrix $BW_rW_sA$. The local spectra $\mu_j$ can be computed as the three-dimensional FFT of j-th column of $\tilde{R}$, and the elements of $\tilde{R}$ are given as $$[\tilde{R}]_{ij} = \begin{cases} \sum_{k \in N_j} \omega_{jk} & i = j \\ -\omega_{ij} & i \neq j, i \in N_j \end{cases}.$$

Figure 2B:
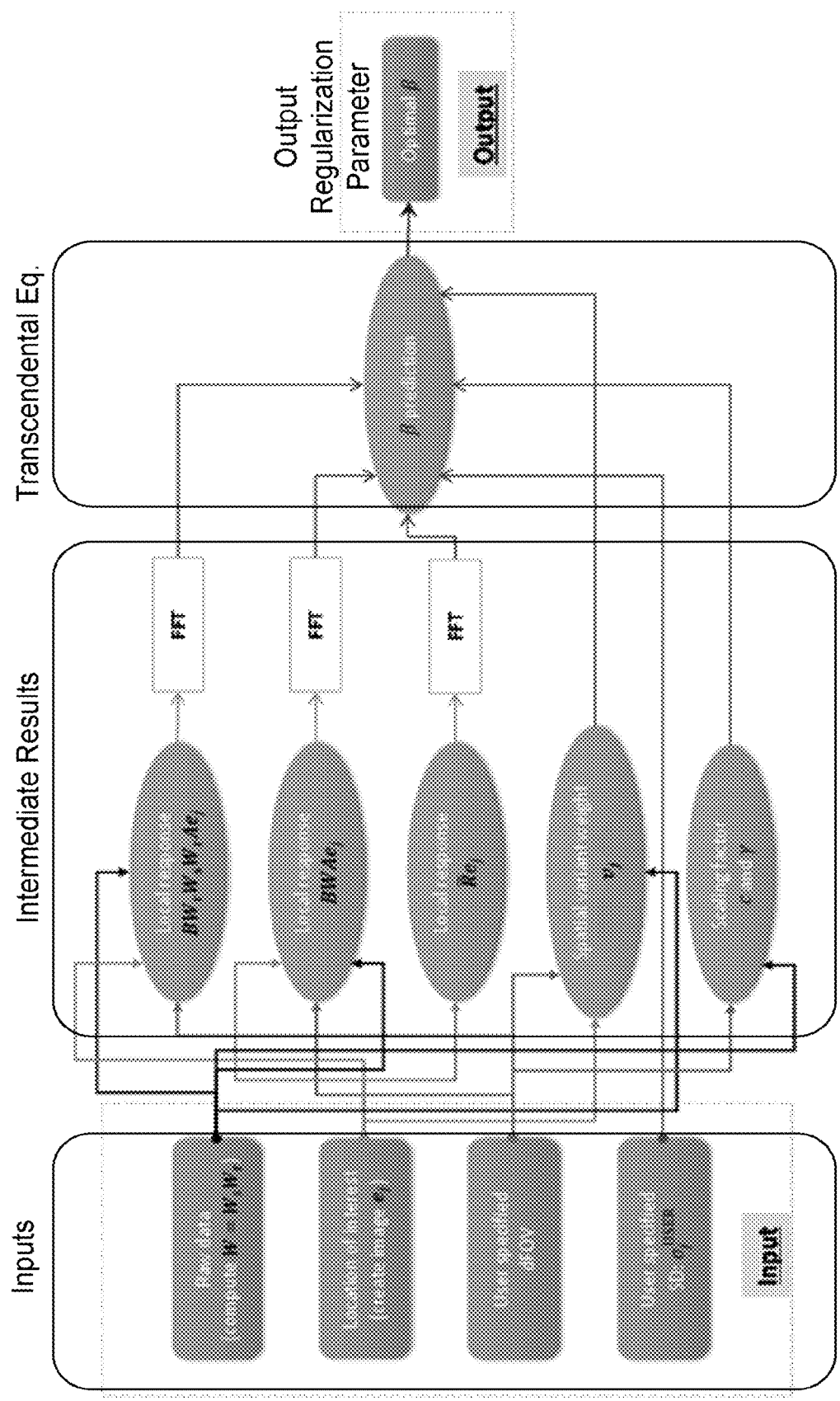
FIG. 2B shows a flow diagram of a process of calculating a transcendental objective function for predicting the regularization parameter.

Applying the above equations, FIG. 2A shows a method 100 of predicting a regulation parameter β in order to achieve a specified noise standard deviation at pixel j, which is $\sigma_j^{USER}$. Further, FIG. 2B shows a flow diagram of the process of calculating the transcendental objective function based in the inputs of the raw data, the pixel/region of interest in the reconstructed image, the dFOV, and the user's specified standard deviation (SD)$\sigma_j^{USER}$.

In step 110 of method 100, the X-ray data y is obtained. The X-ray data can be CT projection data or PET data). The X-ray data y can be obtained using measurements performed by a CT scanner or a PET scanner. Alternatively, X-ray data y can be obtained by retrieving previously generated projection data or PET data from a computer-readable memory in which the X-ray data was stored.

In step 120 of method 100, a region of interest (e.g., pixel(s) within reconstructed image) is selected for the regularization-parameter determination. For example, the user can specify the region of interest by using a mouse to click on a pixel in a screen or typing in a pixel coordinate. Also, a user can specify a region of interest to include all pixels within a three-dimensional geometrical shape that circumscribes several pixels. Additionally, the user desired noise standard deviation at $\sigma_j^{USER}$ is specified.

TABLE 1

Automated method of selecting a region of intrest with a reconstructed image.

1. Generate a preliminary image (e.g., using a fast method, such as down sampling and using filtered back-projection for CT data)
2. Pick the targeted slice from an input volume (e.g., a central axial slice can be the default);
3. Calculate a histogram within the targeted slice using a predefined number of bins (e.g. 200), while excluding mask regions and air regions defined according to a predefined absorption threshold, find the peak (HU) on the histogram, then get the number of pixels belong to this bin, N.
    If: N is less than a predefined threshold T,
        Then return the coordinates of axial center
    Else: go to next step
4. For a given HU window, e.g. [HU+/− 100], find and exclude all pixels located on the boundary.
5. Calculate the distance for each pixel to axial center, return, as the pixel of interest, the pixel closest to axial center.

In certain implementations an automated algorithm can be used to define the region of interest. For example, the process outlined in Table 1 can be used to automatically select a region of interest. Any of the pixels within the dFOV can be used. Table 1 provides an example of a process whereby pixel coordinates can be selected in a fast and stable manner.

When more than one pixel is in the region of interest an average of the objective function φ(•) calculated for each pixel within the region of interest is used. For simplicity the discussion herein discusses the case of a single pixel, but the generalization to a region of interest that includes many pixels is a straightforward, as would be understood by one of ordinary skill in the art.

dimensional FFT of the j-th column of the respective matrices is used, as indicated in FIG. 2B.

After calculating the intermediate results in step 132, in step 134 the transcendental objective function is calculated based on the intermediate results. This is calculated using the expression

TABLE 2

Intermediate results together with their inputs and outputs that are used in calculating the transcendental objective function to predict the regularization parameter that generates desired noise characteristics in a reconstructed image of a given dFOV . . .

| Module name | Input | Output | Comments |
|---|---|---|---|
| Local response $BW_rW_s$ $W_rAe_j$ | $e_j, W_r, W_s$ | $BW_rW_sW_rAe_j$ [vector or 3D volume] | Needs one forward projection and one backprojection. These two projections need to specify the dFOV size and location of interest. Weight capping included if needed. |
| Local response $BW_rW_sAe_j$ | $e_j, W_r, W_s$ | $BW_rW_sAe_j$ [vector or 3D volume] | Needs one forward projection and one backprojection (The forward projection can be omitted since it can be produced by the calculation of $W_rW_sAe_j$). |
| Local response $\tilde{R}e_j$ | $e_j$, neighborhood size, variance of Gaussian neighborhood kernel | $\tilde{R}e_j$ [vector or 3D volume] | Shift invariant approximation. |
| Spatial variant weight $v_j$ | $e_j$, w | [scalar] | Needs on backprojection (not necessarily repeated if integrated in IR). |
| Fast Fourier Transform | Any 3D image volume | Frequency spectrum [3D volume] | 3D FFT. Can be implemented efficiently using any existing FFT libraries. |
| β prediction | FFT of $BW_rW_sW_rAe_j$, FFT of $BWAe_j$, FFT of $\tilde{R}e_j$, $\sigma_j^{USER}$, c and γ | Desired parameter β [scalar] | Main module which utilizes the proposed bisection algorithm to find out the desired parameter β. |

Having selected a region of interest in step 120, method 100 proceeds to process 130. Process 130 includes steps 132, 134, and 136. In process 130, the regularization parameter used in iterative reconstruction is estimated by using a root finding method on the objective function. The estimated regularization parameter has the beneficial property of generating a reconstructed image with the desired statistical properties in the selected region of interest. FIG. 2B shows a flow diagram of how the transcendental objective function can be calculated.

In step 132, the intermediate results feeding into the transcendental objective function are calculated. Table 2 summarizes the intermediate result used in the calculation of the transcendental objective function. As shown in FIG. 2B, the weighting matrix is calculated from the raw X-ray data. The weighting matrix and the size of the dFOV are then used to calculate the scaling factors c and γ. The spatial variant weight $v_j$ at pixel j is calculated using the weight matrix, the coordinates of the pixel j, and the size of the dFOV. The definition of the spatial variant weight $v_j$ is obtained from the definition of the regularization function. The local response for the matrix $\tilde{R}$ depends on the coordinates of the pixel j and the weights in the definition of the regularization function. The local response for the matrix BWA depends on the coordinates of the pixel j, the weight matrix, and the size of the dFOV. Similarly, if the capping value is used in a certain implementation, then the local response for the matrix $BW_rW_sA$ depends on the coordinates of the pixel j, the weight matrix, the size of the dFOV, and the capping value. The local responses are not used directly in calculating the transcendental objective function, but instead the three- $$\phi(\beta \mid \sigma_j^{USER}) = \sigma_j^{USER} - c \cdot \gamma \sqrt{\sum_l \frac{[\tilde{\lambda}_j]_l}{\left([\lambda_j]_l + \beta \cdot 100 \cdot \frac{v_j}{\sqrt{\tau(\sigma_j^{USER})^2 + \delta^2}} \cdot [\tilde{\mu}_j]_l\right)^2}}.$$

In step 136, a root finding method is applied to solve for the regularization parameter at the root. Examples, of root finding algorithms that can be used to solve for the root of the transcendental objective function include: Netwon's method, a Secant method, an interpolation-based method, an inverse-interpolation-based method, a Brent's method, a Budan-Fourier-based method, and a Strum-chain-based method. Additionally, FIG. 3 and Table 3 provides a bisection-root-finding method 300 that can be used to perform step 136.

TABLE 3

Bisection root finding method.

1. Set $\beta_{min}$, $\beta_{max}$, and $\sigma_j^{USER}$;
   Set an error tolerance ε (e.g., 1 HU);
   Set the maximum iteration number $n_{max}$ (e.g., 20);
   Set n = 1;
2. For n ≤ $n_{max}$ do a. Compute $\beta^n = \frac{\beta_{min} + \beta_{max}}{2}$;

TABLE 3-continued

Bisection root finding method.

b. If $|\phi(\beta^n | \sigma_j^{USER})| < \epsilon$, then
     output $\beta = \beta^n$, and stop iteration;
  c. Else
     If $\text{sign}(\phi(\beta^n | \sigma_j^{USER})) = \text{sign}(\phi(\beta_{min} | \sigma_j^{USER}))$, then
        $\beta_{min} = \beta^n$;
     Else
        $\beta_{max} = \beta^n$;
  d. n = n + 1;
3. Not find the root (root is outside of the range), then use default $\beta$ value (e.g. 0).

In step 310 of method 300, various input parameters are initialized. For example, the voxel coordinates for the region of interest will be obtained as an input along with other inputs such as the user defined desired standard deviation $\sigma_j^{USER}$. In addition, a loop variable n and a range of regularization parameter between $\beta_{min}$ and $\beta_{max}$ are also initialized. This corresponds to the first four lines in Table 3 (i.e., Table 3 enumerated step 1). As shown in Table 3, the stopping criteria can also be initialized at this time, and the stopping criteria can include an error tolerance $\epsilon$ (e.g., 1 HU) and a maximum number of iterations $n_{max}$ (e.g., 20).

In step 320 of method 300, a midpoint $\beta_n$ between extrema $\beta_{min}$ and $\beta_{max}$ of the regularization-parameter range is computed (e.g., Table 3 enumerated step 2.a).

In step 330 of method 300, the value of objective function at midpoint $\beta_n$ is calculated.

In step 340 of method 300, the stopping criteria are evaluated. For example, if the value of objective function at midpoint $\beta_n$ is less than the predefined error tolerance $\epsilon$, then the stopping criteria are satisfied and the midpoint $\beta_n$ is output as the regularization parameter (e.g., Table 3 enumerated step 2.b). If the maximum number of iteration is exceeded, then a default value is returned as the regularization parameter (e.g., Table 3 enumerated step 3). In an alternative implementation, when the maximum number of iteration is exceeded, then the regularization parameter of the set $\{\beta_{min}, \beta_{max}, \text{and } \beta_n\}$ yielding a value of the objective function closest zero is returned as the regularization parameter. If the stopping criteria is not satisfied then method 300 proceeds to step 350.

In step 350 of method 300, the regularization-parameter range is changed based on the sign of objective function at midpoint $\beta_n$. If the objective function at midpoint $\beta_n$ has the same sign as the objective function at midpoint $\beta_{min}$ then the new $\beta_{min}$ is set to the value of $\beta_n$. Otherwise, the new $\beta_{max}$ is set to the value of $\beta_n$ (e.g., Table 3 enumerated step 2.c).

In step 360 of method 300, the loop variable is incremented, and another iteration of the loop is began by the method 300 returning to step 320 (e.g., Table 3 enumerated step 2.d).

Returning to FIG. 2A, after the regularization parameter has been predicted to generate the desired standard deviation in the reconstructed image, method 100 proceeds to step 140, in which the image is reconstructed using regularized IR implemented with the predicted regularization parameter.

Figure 4A:
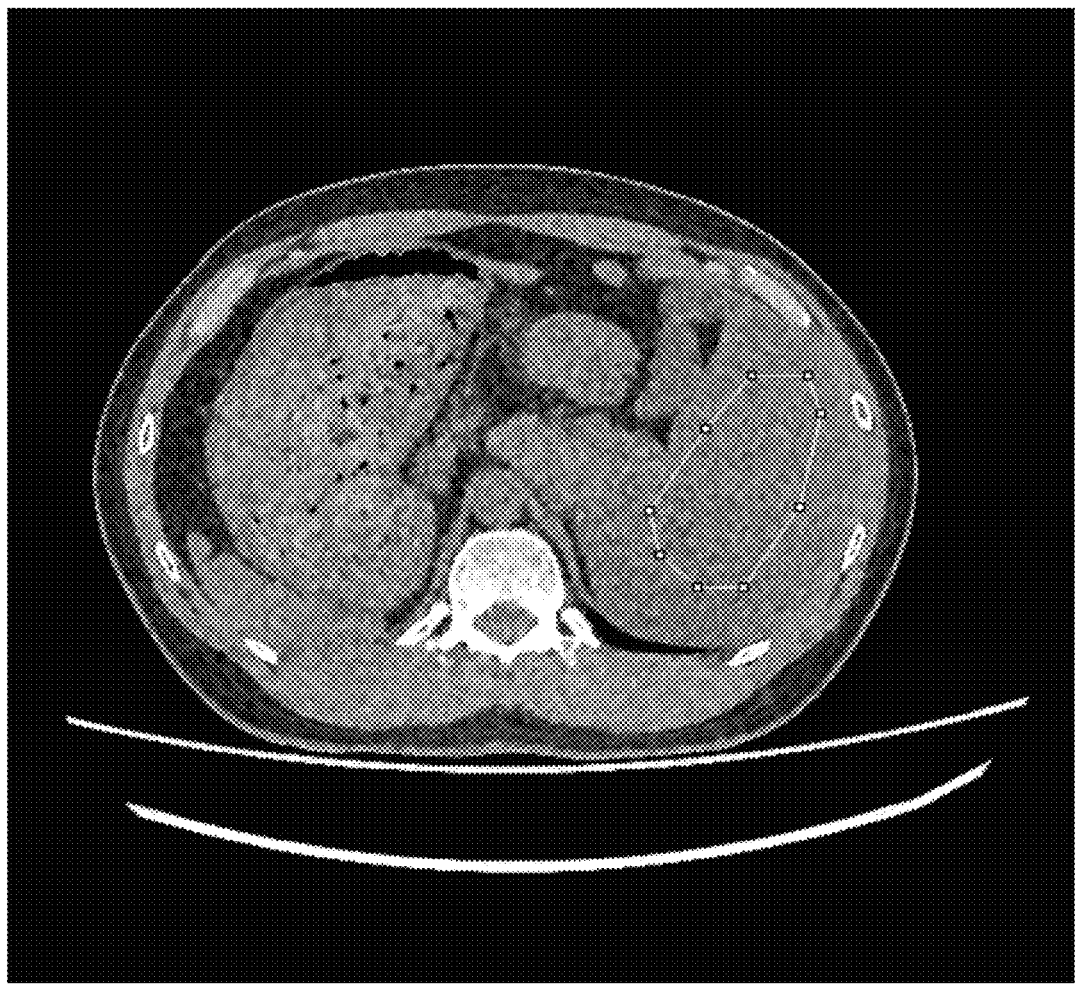
FIG. 4A shows a reconstructed image having a display field of view (dFOV) of 400 mm, and the image was reconstructed using a regularization parameter that was predicted to result in a standard deviation of 20 Hounsfield units (HU) within the indicated region.
Figure 4B:
FIG. 4B a reconstructed image having a display field of view (dFOV) of 200 mm, and the image was reconstructed using the same regularization parameter as used in FIG. 3A.
Figure 4C:
FIG. 4C shows a reconstructed image having a display field of view (dFOV) of 200 mm, and the image was reconstructed using a regularization parameter that was predicted to result in a standard deviation of 20 HU within the indicated region.

FIGS. 4A, 4B, and 4C show an example of reconstructed images obtained for different dFOVs and different regularization parameters. FIG. 4A shows a reconstructed image having a dFOV size of 400 mm. FIG. 4B shows a reconstructed image having a dFOV size of 200 mm and using the same regularization parameter as used in FIG. 4A. FIG. 4B shows a reconstructed image having a dFOV size of 200 mm and using the regularization-parameter-prediction method 100 in order to maintain the same standard deviation as used in FIG. 4A. For each figures a polygon was determined, and a standard deviation was calculated for pixels within the respective polygons. The polygons are shown superimposed on FIGS. 4A, 4B, and 4C. The measured standard deviations for FIGS. 4A, 4B, and 4C are respectively 20.7 HU, 40.0 HU, and 23.4 HU (note: HU stands for Hounsfield units). The target standard deviation was 20 HU for FIGS. 4A and 4C In certain implementations, method 100 can be generalized to predict the regularization parameter providing a desired average standard deviation over multiple pixels. For example, the pixels can be selected from within a volume of the reconstructed image, or from different representative locations throughout the reconstructed image.

In certain implementations, method 100 can be performed using an apparatus to predict the regularization parameter using CT regularized IR to achieve a target noise in reconstructed image by accounting for the reconstructed dFOV, the patient size, and X-ray dose level. The apparatus can perform the steps of: (i) choosing a target standard deviation, (ii) using an automated pixel selection process to determine an image pixel of interest, (iii) computing the local spectra of the Fisher information matrix and the Hessian of the approximated regularization function using a three-dimensional FFT, (iv) using a line search algorithm to predict a regularization parameter that meets the predefined standard deviation, (v) and performing IR using the predicted regularization parameter value.

Further, in certain implementations, the apparatus can perform the steps of using of the automated pixel selection process to determine a pixel (region) of interest can include that, (i) the pixel (region) of interest can be an arbitrary pixel inside the object OBJ being scanned, and (ii) the pixel location can be identified automatically for a given tissue type.

In certain implementations, the apparatus can further perform method 100 by calculating the local spectrum $\tilde{\lambda}_j$ as follows: first, a single pixel j is forward projected using the same forward projector that is used during the regularized IR; second, the result is multiplied with the statistical weight (in certain implementations, the statistical weight is subject to capping, as discussed above) and the redundancy weight; and third, the product is back projected into an image using a back-projector, which is the same back-projector used during the regularized IR. The spectrum $\tilde{\lambda}_j$ is then obtained by performing a three-dimensional FFT of the result these matrix products.

In certain implementations, the apparatus can further perform method 100 by calculating the local spectrum $\lambda_j$ is computed as follows: first, a single pixel j is forward projected using the same forward projector that is used during the regularized IR; second, the result is multiplied with the statistical weight (in certain implementations, the statistical weight is subject to capping, as discussed above) and the redundancy weight; and third, the product is back projected into an image, which is the same back-projector used during the regularized IR. The spectrum $\lambda_j$ is then obtained by performing a three-dimensional FFT of the result these matrix products.

In certain implementations, the apparatus can further perform method 100 by calculating the local spectrum $\tilde{\mu}_j$ is computed as follows: first, a three-dimensional image is defined; second, the value of pixel j is set to the sum of total neighborhood weights; third each neighbor of pixel j is set to the negative neighborhood weight; fourth, the spectrum $\tilde{\mu}_j$ is obtained by performing a three-dimensional FFT of the result these matrix products. The neighboring weights can be normalized such that the sum neighborhood weight is equal to one In certain implementations, the weight cap value can be selected or learned using training data. For example, the weight cap value can be selected or learned using machine learning such as a artificial neural network, support-vector machine, or principal component analysis. In certain implementations, the weight cap value can be selected in accordance to a default value based on a particular type of clinical task or imaging to be performed.

In certain implementations, the proposed method enables the estimation of noise for any single pixel within the dFOV. In alternative implementations, the prediction of the regularization parameter can be based on an average over several pixels noise within a region of interest. Thus, the regularization parameter prediction method can be applied to estimate average image noise by averaging the standard deviation of multiple pixels.

In certain implementations, the above expressions can be used to calculate the standard deviation based on a user determined regulation parameter, rather than calculating regulation parameter based on a user determined standard deviation. Thus, in one way, the method can start with a standard deviation in order to determine a regularization parameter. While, in another way, the method can start with a regularization parameter in order to determine a standard deviation.

In certain implementations, method 100 can be modified to estimate the regularization parameter to obtain a desired local spatial resolution in the reconstructed image that is obtained using a regularized IR.

In certain implementations, the X-ray data can be CT projection data, and the reconstructed image can be a CT image. In other implementations, the X-ray data can be PET data, and the reconstructed image can be a PET image.

In certain implementations, method 100 can be modified to estimate the regularization parameter to optimize a specific imaging task that uses regularized IR. For example, the specific imaging task can be an imaging task that uses the d-prime metric, which can be determined using the regulation parameter to compute the modulation transfer function (MTF) and the noise power spectrum (NPS). For example, a non-prewhitening (NPW) d-prime that can be used is $$d_{NPW} = \frac{\int\int MTF(u, v) W_{Task}(u, v) du dv}{\int\int NNPS(u, v) MTF^2(u, v) W_{Task}^2(u, v) du dv}$$

wherein $W_{Task}$ can be lesion template.

In certain implementations, method 100 can be adapted to PET and SPECT regularized IR, wherein the regularization parameter is determined to achieve a desired noise, or image resolution at a desired spatial location (e.g., at a pixel location or a location of a region of interest that includes several pixels), or for some specific imaging task, such as lesion detectability or lesion kinetic parameter detection.

Two significant advantages of method 100 are: (i) the proposed noise analysis is well suited to analyze practical fast and efficient X-ray CT image reconstruction where a pair of unmatched projectors are used to accelerate reconstruction speed without significant loss image quality; and (ii) the proposed local shift-invariant Hessian matrix approximation of the regularization function provides improvements over previous methods. Method 100 is more practical than the mean image-based approximation and Monte-Carlo based method since no extra reconstruction is required. Also method 100 is more stable than a direct data plug-in method.

Figure 5:
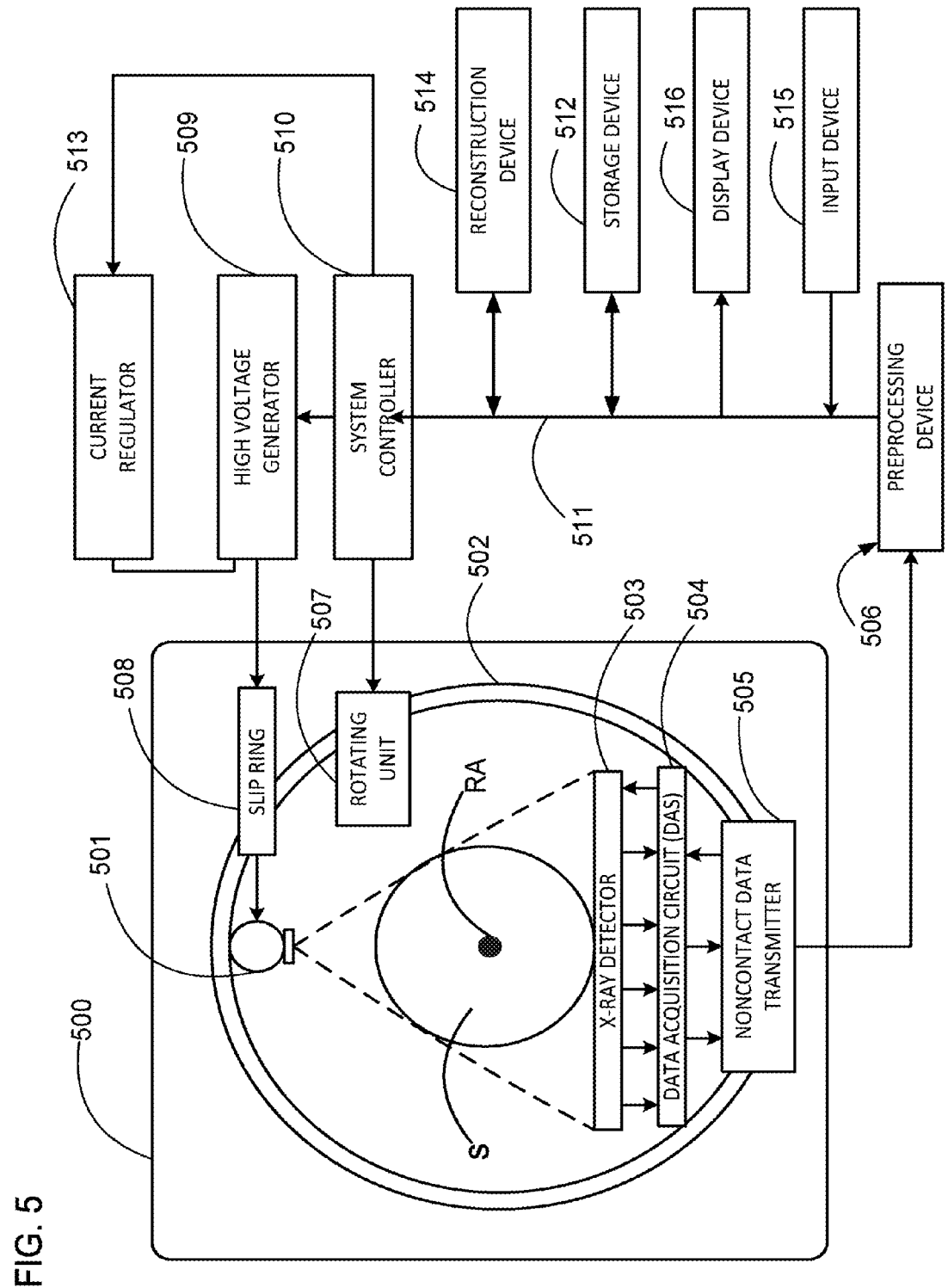
FIG. 5 shows a schematic of an implementation of a CT scanner, according to one implementation.

FIG. 5 illustrates an implementation of the radiography gantry included in a CT apparatus or scanner. As shown in FIG. 5, a radiography gantry 500 is illustrated from a side view and further includes an X-ray tube 501, an annular frame 502, and a multi-row or two-dimensional-array-type X-ray detector 503. The X-ray tube 501 and X-ray detector 503 are diametrically mounted across an object OBJ on the annular frame 502, which is rotatably supported around a rotation axis RA. A rotating unit 507 rotates the annular frame 502 at a high speed, such as 0.4 sec/rotation, while the object OBJ is being moved along the axis RA into or out of the illustrated page.

The first embodiment of an X-ray computed tomography (CT) apparatus according to the present inventions will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate type, which is currently the mainstream, will be exemplified.

The multi-slice X-ray CT apparatus further includes a high voltage generator 509 that generates a tube voltage applied to the X-ray tube 501 through a slip ring 508 so that the X-ray tube 501 generates X-rays. The X-rays are emitted towards the object OBJ, whose cross sectional area is represented by a circle. For example, the X-ray tube 501 having an average X-ray energy during a first scan that is less than an average X-ray energy during a second scan. Thus, two or more scans can be obtained corresponding to different X-ray energies. The X-ray detector 503 is located at an opposite side from the X-ray tube 501 across the object OBJ for detecting the emitted X-rays that have transmitted through the object OBJ. The X-ray detector 503 further includes individual detector elements or units.

The CT apparatus further includes other devices for processing the detected signals from X-ray detector 503. A data acquisition circuit or a Data Acquisition System (DAS) 504 converts a signal output from the X-ray detector 503 for each channel into a voltage signal, amplifies the signal, and further converts the signal into a digital signal. The X-ray detector 503 and the DAS 504 are configured to handle a predetermined total number of projections per rotation (TPPR).

The above-described data is sent to a preprocessing device 506, which is housed in a console outside the radiography gantry 500 through a non-contact data transmitter 505. The preprocessing device 506 performs certain corrections, such as sensitivity correction on the raw data. A memory 512 stores the resultant data, which is also called projection data at a stage immediately before reconstruction processing. The memory 512 is connected to a system controller 510 through a data/control bus 511, together with a reconstruction device 514, input device 515, and display 516. The system controller 510 controls a current regulator 513 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 501 and the X-ray detector 503 are diametrically mounted on the annular frame 502 and are rotated around the object OBJ as the annular frame 502 is rotated about the rotation axis RA. In the fourth-generation geometry system, the detectors are fixedly placed around the patient and an X-ray tube rotates around the patient. In an alternative embodiment, the radiography gantry 500 has multiple detectors arranged on the annular frame 502, which is supported by a C-arm and a stand.

The memory 512 can store the measurement value representative of the irradiance of the X-rays at the X-ray detector unit 503. Further, the memory 512 can store a dedicated program for executing the method 100 and for CT/PET regularized IR discussed herein.

The reconstruction device 514 can execute the transcendental objective function calculations, method 100, and regularized IR image reconstruction as discussed herein. Further, reconstruction device 514 can execute pre-reconstruction processing image processing such as volume rendering processing and image difference processing as needed.

The pre-reconstruction processing of the projection data performed by the preprocessing device 506 can include correcting for detector calibrations, detector nonlinearities, and polar effects, for example.

Post-reconstruction processing performed by the reconstruction device 514 can include filtering and smoothing the image, volume rendering processing, and image difference processing as needed. The image reconstruction process can use any of the implementations for image reconstruction using method 100 discussed herein. The reconstruction device 514 can use the memory to store, e.g., projection data, reconstructed images, calibration data and parameters, and computer programs.

The reconstruction device 514 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 512 can be non-volatile, such as ROM, EPROM, EEPROM or FLASH memory. The memory 512 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 514 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 516. The display 516 can be an LCD display, CRT display, plasma display, OLED, LED or any other display known in the art.

The memory 512 can be a hard disk drive, CD-ROM drive, DVD drive, FLASH drive, RAM, ROM or any other electronic storage known in the art.

In one implementation, the reconstructed images can be displayed on a display. The display can be an LCD display, CRT display, plasma display, OLED, LED or any other display known in the art.

The memory 1478 can be a hard disk drive, CD-ROM drive, DVD drive, FLASH drive, RAM, ROM or any other electronic storage known in the art.

The network controller 1480, such as an Intel Ethernet PRO network interface card from Intel Corporation of America, can interface between the various parts of the CT scanner. Additionally, the network controller 1480 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus, comprising:
   processing circuitry configured to
   obtain radiation detection data representing an intensity of X-ray radiation detected at a plurality of detector elements,
   predict a regularization parameter that multiplies a regularization function, the regularization parameter being predicted to generate a reconstructed image having predefined statistical properties within a region of interest, when the reconstructed image is reconstructed using the radiation detection data and a regularized iterative reconstruction process that includes the regularization function and the regularization parameter, and
   iteratively reconstruct the reconstructed image based on the radiation detection data using the regularized iterative reconstruction process that includes the regularization function and the regularization parameter.

2. The apparatus according to claim 1, wherein the processing circuitry is further configured to predict the regularization parameter using a system model that includes a forward-projection matrix and a back-projection matrix, a product of the forward-projection matrix and the back-projection matrix being a non-identity matrix.

3. The apparatus according to claim 2, wherein the processing circuitry is further configured to predict the regularization parameter to generate the reconstructed image having the predefined statistical properties, the predefined statistical properties being one of a low-contrast-detectability-model parameter, a modulation-transfer-function parameter, a noise-power-spectrum parameter, a d-prime metric, and a standard deviation.

4. The apparatus according to claim 2, wherein the processing circuitry is further configured to predict the regularization parameter using a calculation of a three-dimensional Fourier transform of a matrix product that includes the back-projection matrix and the forward-projection matrix.

5. The apparatus according to claim 2, wherein the processing circuitry is further configured to predict the regularization parameter using a calculation of an approximation of a shift invariant Hessian matrix.

6. The apparatus according to claim 2, wherein the processing circuitry is further configured to predict the regularization parameter to generate the reconstructed image having the predefined statistical properties within the region of interest, the region of interest including a plurality of pixels or pixels.

7. The apparatus according to claim 1, wherein the processing circuitry is further configured to select the region of interest in the reconstructed image to be arranged within a region of uniform density within the reconstructed image.

8. The apparatus according to claim 1, wherein the processing circuitry is further configured to iteratively reconstruct the reconstructed image using the regularization function, which is one or more of a quadratic regularization function, a non-quadratic regularization function, and Huber regularization function, and a total-variation minimization regularization function.

9. The apparatus according to claim 1, wherein the processing circuitry is further configured to predict the regularization parameter using a root-finding method to find a root of a objective function, the root-finding method being one of a Newton's root-finding method, a secant root-finding method, a bisection root-finding method, an interpolation-based root-finding method, an inverse-interpolation-based root-finding method, a Brent's root-finding method, a Budan-Fourier-based root-finding method, and a Strum-chain-based root-finding method.

10. The apparatus according to claim 9, wherein the processing circuitry is further configured to predict the regularization parameter using the bisection root finding method by
  determining a parameter range for the regularization parameter, the parameter range spanning from a lower value to an upper value,
  determining a mid-point value between the lower value and the upper value,
  querying whether an objective function for predicting the regularization parameter when evaluated at the mid-point value has an absolute value less than a predefined threshold,
  returning the mid-point value when the objective function evaluated using the mid-point value has the absolute value less than the predefined threshold,
  setting the upper value to the mid-point value when the objective function evaluated using the mid-point value has the absolute value greater than the predefined threshold and a sign of the objective function evaluated using the mid-point value is equal to a sign of the objective function evaluated using the upper value, and
  setting the lower value to the mid-point value when the objective function evaluated using the mid-point value has the absolute value greater than the predefined threshold and a sign of the objective function evaluated using the mid-point value is equal to a sign of the objective function evaluated using the lower value.

11. The apparatus according to claim 1, wherein the processing circuitry is further configured to predict the regularization parameter using a weight matrix that includes diagonal values determined using a predefined cap value.

12. The apparatus according to claim 11, wherein the diagonal values of the weight matrix include a ratio between a square of an inverse variance and a minimum between the inverse variance and the cap value.

13. The apparatus according to claim 1, wherein the processing circuitry is further configured to predict the regularization parameter to account for
  a size of a display field of view used in the iterative reconstruction of the reconstructed image,
  a system model that includes a forward-projection matrix and a back-projection matrix used in the iterative reconstruction of the reconstructed image, and
  a weighting matric representing statistical properties of the radiation detection data.

14. The apparatus according to claim 1, wherein the processing circuitry is further configured to obtain the radiation detection data, which is one of computed-tomography projection data, and positron-emission tomography detection data.

15. The apparatus according to claim 1, wherein the processing circuitry is further configured to predict the regularization parameter using three dimensional Fourier transformations of respective local response arrays of matrices representing
  an approximation of a shift-invariant Hessian matrix,
  a matrix product including a back-projection matrix, a diagonal weight matrix, a statistical weight matrix, and a forward-projection matrix, and
  a matrix product including the back-projection matrix, the statistical weight matrix, a diagonal weight matrix for which a weight cap has been applied, and the forward-projection matrix.

16. The apparatus according to claim 1, wherein the processing circuitry is further configured to estimate a standard deviation of the reconstructed image within a region of interest by solving an objective function based on a selected regularization parameter, a display field of view, a back-projection matrix, a forward-projection matrix.

17. An apparatus, comprising:
  an X-ray source radiating X-rays;
  a plurality of detector elements each configured to
    detect a plurality of energy components of the X-rays that are radiated from the X-ray source,
    generate projection data representing an intensity of X-ray radiation detected at a plurality of energy-resolving detector elements; and
  processing circuitry configured to
    predict a regularization parameter that multiplies a regularization function, the regularization parameter being predicted to generate a reconstructed image having predefined statistical properties within a region of interest, when the reconstructed image is reconstructed using the radiation detection data and a regularized iterative reconstruction process that includes the regularization function and the regularization parameter, and
    iteratively reconstruct the reconstructed image based on the projection data using the regularized iterative reconstruction process that includes the regularization function and the regularization parameter.

18. The apparatus according to claim 17, wherein the processing circuitry is further configured to predict the regularization parameter by solving a objective function based on a desired standard deviation of the reconstructed image within a region of interest, a display field of view, a system model including a back-projection matrix and a forward-projection matrix.

19. A method, comprising:
   obtaining radiation detection data representing an intensity of X-ray radiation detected at a plurality of detector elements,
   predict a regularization parameter that multiplies a regularization function, the regularization parameter being predicted to generate a reconstructed image having predefined statistical properties within a region of interest, when the reconstructed image is reconstructed using the radiation detection data and a regularized iterative reconstruction process that includes the regularization function and the regularization parameter, and
   iteratively reconstruct the reconstructed image based on the radiation detection data using the regularized iterative reconstruction process that includes the regularization function and the regularization parameter.

20. A non-transitory computer readable storage medium including executable instruction, wherein the instructions, when executed by circuitry, cause the circuitry to perform the method according to claim 19.

* * * * *